United States Patent
Yamaki et al.

(10) Patent No.: US 9,424,126 B2
(45) Date of Patent: Aug. 23, 2016

(54) MEMORY CONTROLLER

(71) Applicant: Kabushiki Kaisha Toshiba, Minato-ku (JP)

(72) Inventors: Ryo Yamaki, Yokohama (JP); Naomi Takeda, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 181 days.

(21) Appl. No.: 14/205,800

(22) Filed: Mar. 12, 2014

(65) Prior Publication Data

US 2015/0067439 A1    Mar. 5, 2015

Related U.S. Application Data

(60) Provisional application No. 61/872,894, filed on Sep. 3, 2013.

(51) Int. Cl.
| G06F 11/10 | (2006.01) |
| G06F 11/00 | (2006.01) |
| G11B 20/18 | (2006.01) |
| H03M 13/29 | (2006.01) |
| H04L 1/00 | (2006.01) |

(52) U.S. Cl.
CPC .................................. *G06F 11/1012* (2013.01)

(58) Field of Classification Search
CPC . G06F 11/1012; G06F 11/1068; G06F 11/10; G06F 2211/1028; G11C 2216/14; G11C 29/00; G11C 7/1006; G11C 20/1833
See application file for complete search history.

(56) References Cited

U.S. PATENT DOCUMENTS

| 5,406,425 A * | 4/1995 | Johnston ............... G06F 3/0601 360/48 |
| 6,904,492 B2 * | 6/2005 | Hogan ................ G06F 11/1068 365/175 |
| 6,990,623 B2 | 1/2006 | Furukawa |
| 7,581,153 B2 * | 8/2009 | Micheloni ........... G06F 11/1048 714/763 |
| 7,900,117 B2 | 3/2011 | Kanno |
| 8,006,165 B2 * | 8/2011 | Yoshida .............. G06F 11/1068 714/763 |
| 8,023,535 B2 * | 9/2011 | Yun ...................... H04N 21/235 348/385.1 |
| 8,045,591 B2 * | 10/2011 | Kim ....................... H04H 20/26 348/385.1 |
| 8,312,348 B2 | 11/2012 | Yamaga |
| 8,726,121 B2 * | 5/2014 | Malladi ................ H04L 1/0013 714/755 |
| 2009/0041110 A1 * | 2/2009 | Malladi .................. H04L 1/005 375/240 |

FOREIGN PATENT DOCUMENTS

| JP | 2003-36693 | 2/2003 |
| JP | 2006-40013 | 2/2006 |
| JP | 2009-80651 | 4/2009 |
| JP | 2009-211742 | 9/2009 |

* cited by examiner

*Primary Examiner* — Phung M Chung
(74) *Attorney, Agent, or Firm* — Oblon, McClelland, Maier & Neustadt, L.L.P.

(57) ABSTRACT

According to one embodiment, a memory controller according to the embodiments includes an encoder that sequentially calculates parity based on data; a parity buffer that stores completed parity and intermediate parity based on data less than a predetermined size; a write processing unit that writes data and completed parity on a non-volatile memory; a decoder; and a controller that performs a decoding process based on the data read from the non-volatile memory and the intermediate parity in the parity buffer, when receiving a read request to inputted data in a stage in which the a number of inputted data to the encoder is less than the predetermined size.

13 Claims, 6 Drawing Sheets

MEMORY CONTROLLER

CROSS-REFERENCE TO RELATED APPLICATIONS

This application is based on and claims the benefit of priority from Provisional Patent Application No. 61/872,894, filed on Sep. 3, 2013; the entire contents of which are incorporated herein by reference.

FIELD

Embodiments described herein relate generally to a memory controller.

BACKGROUND

Data is written on a NAND flash memory (hereinafter referred to as a NAND memory) in a writing data unit called a page. There is a method of protecting data stored in the NAND flash memory by performing error-correction coding for each of write data in plural pages.

DETAILED DESCRIPTION

In general, according to one embodiment, a memory controller according to the embodiments includes: an encoder configured to sequentially calculate parity based on inputted data, a parity buffer configured to store at least either one of completed parity calculated based on predetermined size of the data and intermediate parity calculated based on the data having size less than the predetermined size; a write processing unit configured to write the data and the completed parity to a non-volatile memory; a decoder configured to perform a decoding process based on the data and the parity; and a controller configured to allow the decoder to perform decoding based on the data read from the non-volatile memory and the intermediate parity stored in the parity buffer, when a size of the data inputted to the encoder is less than the predetermined size, and a read request to the data inputted to the encoder is received.

Exemplary embodiments of a memory controller will be explained below in detail with reference to the accompanying drawings. The present invention is not limited to the following embodiments.

EMBODIMENTS OF CARRYING OUT THE INVENTION

The memory controller, the storage device, and the memory control method according to the embodiments will be described below in detail with reference to the accompanying drawings. Note that these embodiments do not limit the present invention.

First Embodiment

Figure 1:
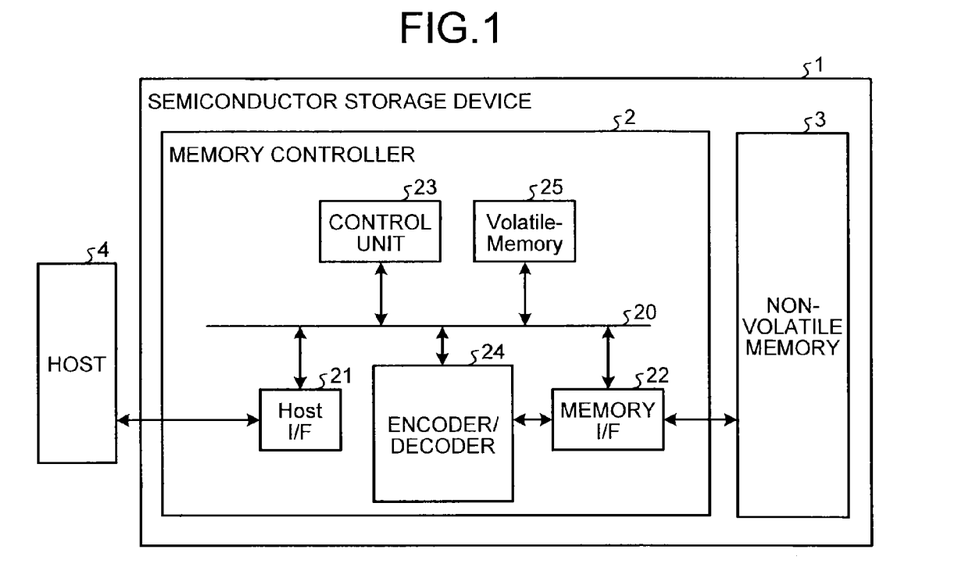
FIG. 1 is a block diagram illustrating an example of a configuration of a semiconductor storage device (storage device) according to a first embodiment.

FIG. 1 is a block diagram illustrating an example of a configuration of a semiconductor storage device (storage device) according to a first embodiment. The semiconductor storage device 1 according to the present embodiment includes a memory controller 2, and a non-volatile memory (non-volatile memory, hereinafter abbreviated as NV-Memory in the drawing according to need) 3. The storage device 1 is connectable to a host 4. In FIG. 1, a state in which the storage device 1 is connected to the host 4 is shown. The host 4 is, for example, an electronic apparatus such as a personal computer or a mobile terminal.

The non-volatile memory 3 is a non-volatile memory that stores data in a non-volatile manner, and it is a NAND memory, for example. In this embodiment, a NAND memory is used as the non-volatile memory 3. However, a storage unit other than the NAND memory may be used. The NAND memory generally writes and reads data in a writing unit generally called a page.

The memory controller 2 controls writing to the non-volatile memory 3 in accordance with a write command (request) from the host 4. The memory controller 2 also controls reading from the non-volatile memory 3 in accordance with a read command (request) from the host 4. The memory controller 2 includes a Host I/F 21, a memory I/F (write processing unit) 22, a control unit 23, an encoder/decoder 24, and a Volatile-Memory 25, these of which are interconnected with an internal bus 20 each other.

The Host I/F 21 outputs a command or user data (write data) received from the host 4 to the internal bus 20. The Host I/F 21 also transmits user data read from the non-volatile memory 3 or a response from the control unit 23 to the host 4.

The memory I/F 22 controls a process of writing user data on the non-volatile memory 3 and a process of reading the data from the non-volatile memory 3 based on the instruction from the control unit 23.

The control unit 23 generally controls the semiconductor storage device 1. The control unit 23 is a Central Processing Unit (CPU), or Micro Processing Unit (MPU) and the like, for example. When receiving a command from the host 4 via the Host I/F 21, the control unit 23 performs a control according to this command. For example, the control unit 23 instructs the memory I/F 22 to write user data and parity to the non-volatile memory 3, or to read user data and parity from the non-volatile memory 3 in accordance with the command from the host 4.

The control unit 23 decides a memory region on the non-volatile memory 3 to the user data stored in the Volatile-Memory 25. The user data is data transmitted from the host 4 as the data to be written on the non-volatile memory 3. The user data is stored in the Volatile-Memory 25 via the internal bus 20. The control unit 23 decides the memory region on a page basis that is a writing data unit. In the present specification, data of a predetermined size (first data size) stored in one page of the non-volatile memory 3 is defined as a page data. The page data is a write unit data. User data of a predetermined size (second data size) stored in one page of the non-volatile memory 3 is defined as a unit data. The page data includes the unit data and inner-page parity corresponding to the unit data, if inner-page parity is generated. The page data is equal to the unit data, if inner-page parity is not generated. In the present specification, one page of the non-volatile memory 3 indicates a memory region composed of a memory cell group commonly connected to one word line. When the memory cell is a single-level cell, the memory cells commonly connected to one word line correspond to one page. When the memory cell is a multiple level cell, the memory cells commonly connected to one word line correspond to plural pages. For example, when a multiple level cell that can store two bits is used, the memory cells commonly connected to one word line correspond to two pages. The control unit 23 decides the memory region on the non-volatile memory 3 that is the writing destination for each unit data. A physical address is allocated to the memory region in the non-volatile memory 3. The control unit 23 manages the memory region, which is the destination to which the unit data is to be written, by using the physical address. The control unit 23 designates the decided memory region (physical address), and instructs the memory I/F 22 to write the user data on the designated memory region in the non-volatile memory 3. The control unit 23 manages a correspondence between a logical address (logical address managed by the host 4) and a physical address of user data. When receiving a read command from the host 4, the control unit 23 specifies the physical address, and instructs the memory I/F 22 to read the user data from the specified physical address.

The encoder/decoder 24 executes an error-correction coding process to generate parity based on the user data (write-data) which are to be stored in the Volatile-Memory 25. In the present embodiment, the error-correction coding process is executed using plural unit data to generate inter-page parity (Parity-B) as a first coding process. The error-correction coding process is executed using one unit data to generate inner-page parity (Parity-A) as a second coding process. It is to be noted that, in the first coding process, the error-correction coding process is executed even to plural Parity-A corresponding to plural unit data to generate inter-page parity (Parity-B). The user data and the Parity-A (second parity) generated using the user data are stored in one page in the non-volatile memory 3. The Parity-B (first parity) is stored in a parity page on the non-volatile memory 3. The parity page is a page in the non-volatile memory 3 into which unit data is not stored but Parity-B is stored. The second coding process may not be executed. When the second coding process is not executed, the error-correction coding process is executed using plural unit data to generate Parity-B.

The encoder/decoder 24 executes a second decoding process using the user data (read-data) and Parity-A read from the non-volatile memory 3. When the encoder/decoder 24 cannot correct an error by the second decoding process, it executes a first decoding process using the user data and Parity-B for plural pages read from the non-volatile memory 3. When the second coding process is not executed in the configuration, the encoder/decoder 24 executes the first decoding process without executing the second decoding process.

FIG. 1 illustrates the configuration in which the memory controller 2 includes the encoder/decoder 24 and the memory I/F 22. However, the encoder/decoder 24 may be incorporated in the memory I/F 22.

The Volatile-Memory 25 temporarily stores the user data received from the host 4 until it is stored in the non-volatile memory 3, or temporarily stores the data read from the non-volatile memory 3 until it is transmitted to the host 4. For example, the Volatile-Memory 25 is composed of a general-purpose memory such as Static Random Access Memory (SRAM) or Dynamic Random Access Memory (DRAM).

Figure 2:
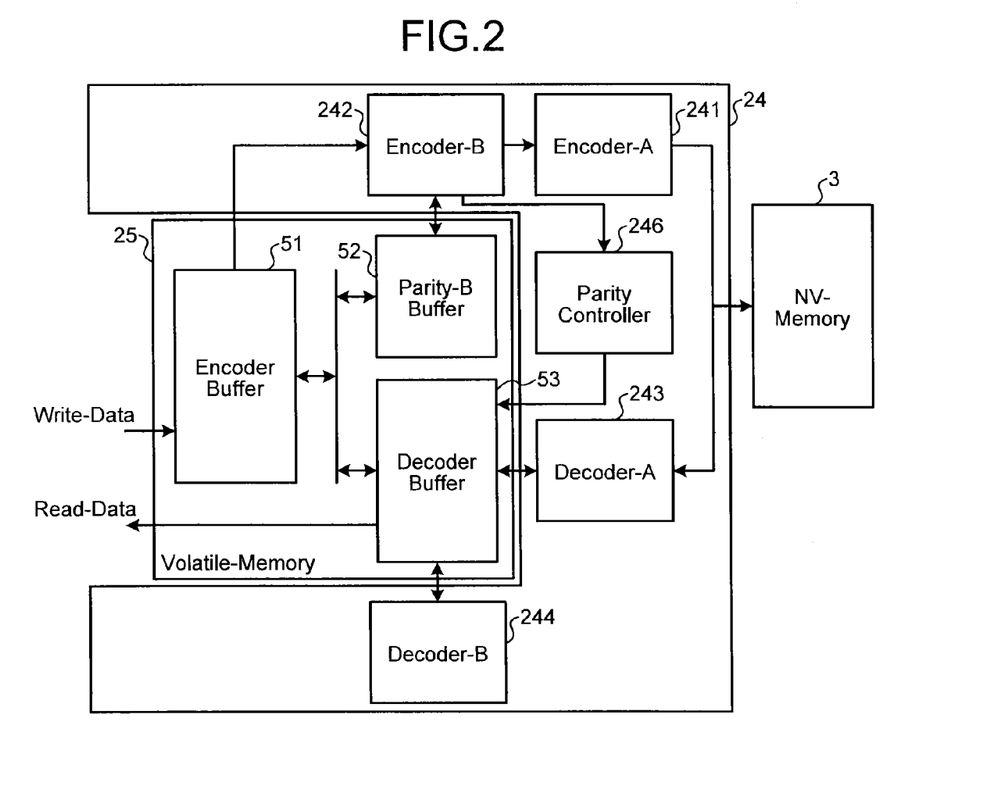
FIG. 2 is a diagram illustrating an example of a configuration of an encoder/decoder according to the first embodiment.

Next, the error-correction coding process according to the present embodiment will be described. FIG. 2 is a diagram illustrating an example of a configuration of the encoder/decoder 24. The encoder/decoder 24 includes an Encoder-A 241, an Encoder-B 242, a Decoder-A 243, a Decoder-B 244, and a Parity Controller 246. The Encoder-A 241 executes the second coding process. The Encoder-B 242 executes the first coding process. The Decoder-A 243 executes the second decoding process. The Decoder-B 244 executes the first decoding process. The Volatile-Memory 25 includes an Encoder Buffer 51, a Parity-B Buffer 52, and a Decoder Buffer 53. In this embodiment, the Encoder Buffer 51, the Parity-B Buffer 52, and the Decoder Buffer 53 are included in the Volatile-Memory 25 separate from the encoder/decoder 24. However, a Volatile-Memory including the Encoder Buffer 51, the Parity-B Buffer 52, and the Decoder Buffer 53 may be provided in the encoder/decoder 24.

Figure 3:
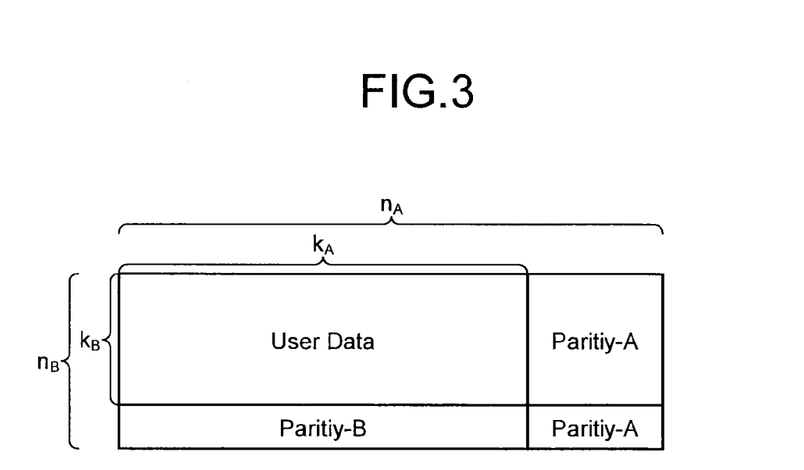
FIG. 3 is a view illustrating one example of a format of data stored in a non-volatile memory.

FIG. 3 is a view illustrating one example of a format of data stored in the non-volatile memory 3 according to the present embodiment. In the present specification, the data length such as a coding length n, information length k, and the like is represented by a byte unit below. However, this does not mean that the size of one symbol in the error-correction coding is one byte. Any restriction is imposed on the size of one symbol. Data in FIG. 3 indicates user data. The data length of one page is specified as $n_A$ bytes, and the data length of unit data is specified as $k_A$ bytes. The Encoder-A 241 generates Parity-A of $(n_A-k_A)$ bytes using the user data of $k_A$ bytes. The Encoder-B 242 generates Parity-B of $(n_B-k_B)$ bytes using user data of $k_B$ bytes composed of one byte data from $k_B$ unit data. In the present embodiment, $n_A \times n_B$ bytes data illustrated in FIG. 3 are defined as a group data. The group data has a predetermined data size (third data size).

The user data received from the host 4 is stored in the Encoder Buffer 51 in the Volatile-Memory 25. The Encoder-B 242 reads the user data stored in the Encoder Buffer 51 for each unit data, and executes the first coding process using the unit data among the group data. The Encoder-B 242 finally generates Parity-B (first parity) using $k_B$ unit data as illustrated in FIG. 3. However, since the writing to the non-volatile memory 3 is performed on the page basis, the input to the Encoder-B 242 is performed on the unit data basis. Accordingly, the Encoder-B 242 repeats an operation of storing an intermediate result (uncompleted Parity-B, intermediate parity) into the Parity-B Buffer 52 for every input of unit data. Specifically, the Encoder-B 242 stores the parity, which is calculated by the first coding process using the unit data, into the Parity-B Buffer 52 as the intermediate result. Then, the Encoder-B 242 calculates parity by the first coding process using the user data newly inputted and the intermediate result stored in the Parity-B Buffer 52. The calculated parity is stored in the Parity-B Buffer 52 as the intermediate result. The Encoder Buffer 51 repeats the operation described above, and when the number of inputted unit data reaches $k_B$, the Encoder Buffer 51 stores the parity calculated by the first coding process into the Encoder-B 242 as the Parity-B. The Encoder-B 242 inputs the inputted Parity-B into the Encoder-A 241.

The Encoder-A 241 executes the second coding process using the unit data or the Parity-B inputted from the Encoder-B 242 to generate Parity-A (second parity). The Encoder-A 241 inputs the unit data or the Parity-B and the generated Parity-A to the memory I/F 22. The memory I/F 22 stores the inputted unit data or the Parity-B and the Parity-A into the non-volatile memory 3 on the page basis. FIG. 2 does not illustrate the memory I/F 22.

Next, the decoding process according to the present embodiment will be described. In this embodiment, the decoding process in which the group data illustrated in FIG. 3 (user data, Parity-A, and Parity-B) are all stored in the non-volatile memory 3 will be described. The memory I/F 22 reads the user data and the Parity-A from the non-volatile memory 3 on the page basis based on the instruction from the control unit 23. The read user data and the Parity-A are inputted to the Decoder-A 243. The Decoder-A 243 performs the second decoding process using the inputted user data and the Parity-A. The Decoder-A 243 stores the inputted user data in the Decoder Buffer 53. When there is an error, and the error correction is possible as a result of the first decoding process, the Decoder-A 243 executes the error correction to the user data stored in the Decoder Buffer 53. The result of the first decoding process is notified to the control unit 23. The control unit 23 controls to read user data having no error and user data whose error correction is possible from the Decoder Buffer 53. The read data is transferred to the host 4 via the Host I/F 21.

The control unit 23 instructs the memory I/F 22 to read the group data (user data, Parity-A, and Parity-B) including the user data to which the error correction is impossible. The read data (user data and Parity-A, or Parity-A and Parity-B) is inputted to the Decoder-A 24 on the page basis. The Decoder-A 243 executes the second decoding process using the inputted user data (user data and Parity-A, or Parity-B and Parity-A). The Decoder-A 243 stores the inputted user data (or Parity-B) in the Decoder Buffer 53. When there is an error, and the error correction is possible as a result of the second decoding process, the Decoder-A 243 executes the error correction to the user data (or Parity-B) stored in the Decoder Buffer 53. When the second decoding process to the user data and the Parity-B in the group data is terminated, the Decoder-B 244 executes the first decoding process using the user data and the Parity-B in the group data stored in the Decoder Buffer 53. When the error correction is possible by the first decoding process, the Decoder-B 244 executes the error correction to the user data stored in the Decoder Buffer 53. The control unit 23 controls to transfer the user data after the error correction to the host 4 via the Host I/F 21.

In the present embodiment, each user data is protected using two parities, which are the Parity-A generated using user data in one page and the Parity-B generated using user data in plural pages, as described above. Thus, when an error correction is impossible by the decoding process using the Parity-A, the decoding process using the Parity-B is then performed, whereby more errors can be corrected than in the case where only the Parity-A is used. In addition, the second decoding process can be executed using the user data to which the error correction is performed by the decoding process using the Parity-B and the Parity-A to perform the error correction, and then, the first decoding process can be performed using the user data to which the error correction is already performed and the Parity-B. In this way, the second decoding process and the first decoding process are repeated, whereby more errors can be corrected, and the reliability of the storage device 1 can be enhanced.

However, when the Parity-B is generated using plural pages, the amount of data forming the group data becomes large. Therefore, there may be the case where the amount of write-data (user data) transmitted from the host 4 is less than the data amount ($k_A \times k_B$ bytes) forming the format of the group data illustrated in FIG. 3. In this case, the user data and the Parity-A transmitted from the host 4 are written on the non-volatile memory 3, but the Parity-B is not written on the non-volatile memory 3, since it is not completed. On the other hand, the intermediate result of the Parity-B is stored in the Parity-B Buffer 52.

Figure 4:
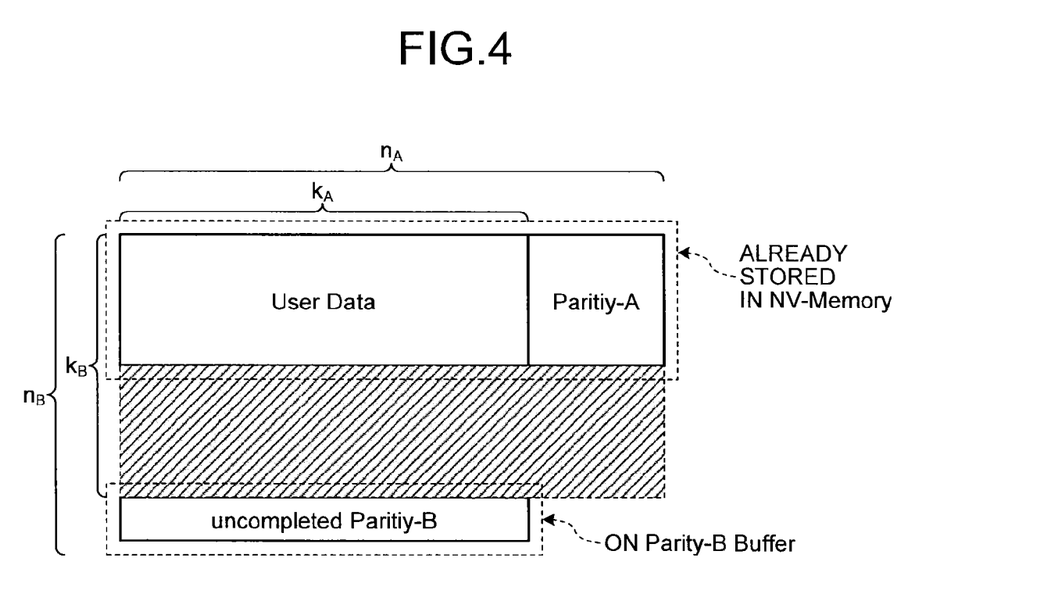
FIG. 4 is a view illustrating a state in which some user data in a format of a group data are stored in the non-volatile memory.

FIG. 4 is a view illustrating a state in which partial user data in the format of the group data are stored in the non-volatile memory 3. As illustrated in FIG. 4, the user data less than $k_B$ and the Parity-A are stored in the non-volatile memory 3. The intermediate result (uncompleted Parity-B) generated using the user data stored in the non-volatile memory 3 is stored in the Parity-B Buffer 52.

It is supposed that, in the state illustrated in FIG. 4, the memory controller 2 receives a read request to data that is already stored in the non-volatile memory 3 from the host 4. In this case, the second decoding process can be executed, since the unit data and the Parity-A are stored in the non-volatile memory 3. However, the general first decoding process cannot be executed, since the Parity-B is not stored in the non-volatile memory 3. In the present embodiment, a data path that copies the intermediate result stored in the Parity-B Buffer 52 and stores the copied result to the Decoder Buffer 53 is provided to execute the execution of the first decoding process even in this case. The Parity Controller 246 manages the calculation state of the Parity-B, i.e., how many unit data are stored in the Encoder-B 242. The Parity Controller 246 controls to copy the intermediate result stored in the Parity-B Buffer 52 and store the copied result to the Decoder Buffer 53, according to the calculation state. The Parity Controller 246 may be provided outside the encoder/decoder 24.

Figure 5:
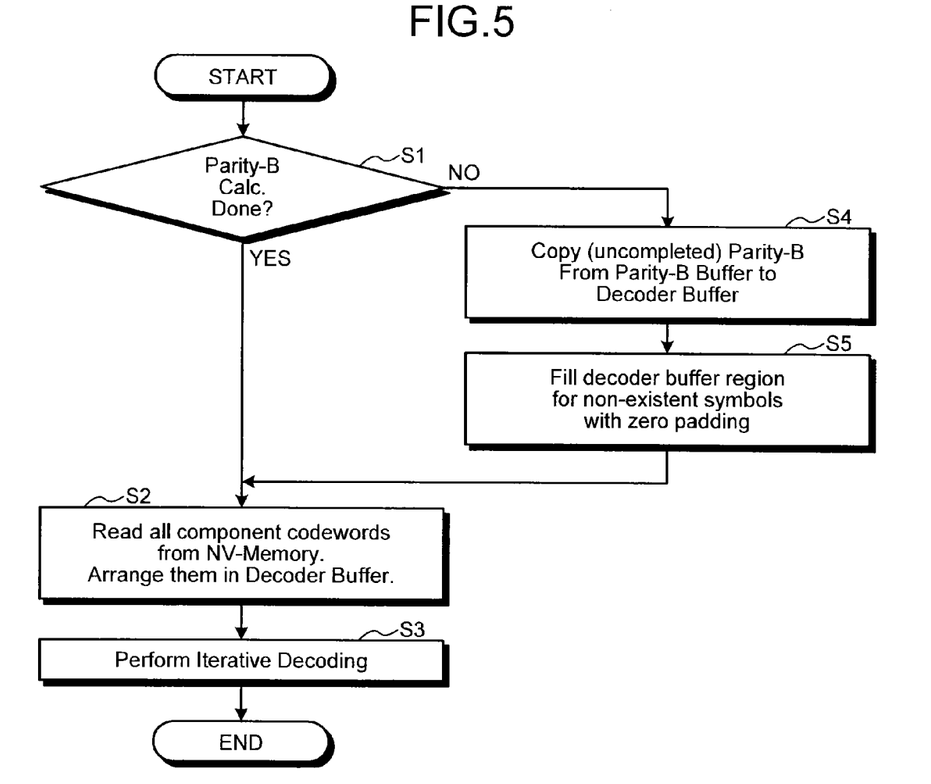
FIG. 5 is a view illustrating one example of a first decoding control according to the first embodiment.

FIG. 5 is a view illustrating one example of a procedure of the first decoding control according to the present embodiment. Regardless of the calculation state of the Parity-B, the Encoder-A 241 executes the second decoding process using the input data (unit data and Parity-A, or Parity-B and Parity-A). When there is unit data whose error correction is impossible by the second decoding process, the first decoding control illustrated in FIG. 5 is started. When there is user data whose error correction is impossible by the first decoding process, the Parity Controller 246 determines whether the calculation of the Parity-B of the group data including this user data is completed or not (step S1). When the calculation of the Parity-B is completed (step S1, Yes), the Parity Controller 246 reads all component codewords in the group data from the non-volatile memory 3, and stores these data into the Decoder Buffer 53 (step S2).

The Decoder-A 243 and the Decoder-B 244 executes iterative decoding using the group data stored in the Decoder Buffer 53 (step S3), and then, the process is terminated. The iterative decoding means the process of repeating the second decoding process and the first decoding process, such that the second decoding process is performed using the result obtained by the error correction in the first decoding process as described above. When all errors can be corrected by the first decoding process in the first try, the process is terminated without being iterated.

When the calculation of the Parity-B is not completed (step S1 No), the Parity Controller 246 controls to copy the intermediate result stored in the Parity-B Buffer 52 and store the copied result to the Decoder Buffer 53 (step S4). A region corresponding to the group data (the format illustrated in FIG. 3) is secured on the Decoder Buffer 53. The intermediate result is stored in the region corresponding to the Parity-B among the region corresponding to the group data on the Decoder Buffer 53. The Parity Controller 246 pads the region where the user data is not written on the non-volatile memory 3, in the region corresponding to the group data on the Decoder Buffer 53, with zero (step S5). After step S5, the process proceeds to step S3. If the process passes steps S4 and S5, only the data that was already stored in the non-volatile memory 3 is read as all component codewords in the group data in step S2.

From the process described above, when there are codewords that are not yet written on the non-volatile memory 3 in the format illustrated in FIG. 3, zero is written in the region for non-existent symbols on the Decoder Buffer 53. The intermediate result is stored in the region on the Decoder Buffer 53 corresponding to the Parity-B. Accordingly, the user data read from the non-volatile memory 3 is inputted to the Decoder-B 244 as the part of group data, corresponding to data that is already stored on the non-volatile memory 3. On the other hand, zero is inputted to the Decoder-B 244 as the part corresponding to data that is not yet written on the non-volatile memory 3. The intermediate result is inputted to the Decoder-B 244 as Parity-B. The Decoder-B 244 can correct an error in the user data that is already stored in the non-volatile memory 3 using the inputted user data and the intermediate result.

As described above, in the present embodiment, the intermediate result is stored in the region corresponding to the Parity-B in the Decoder Buffer 53, when the read request to the user data, which is already written, in the group data is issued, and an error correction is impossible by the second decoding process, in the state in which the group data is not completely written on the non-volatile memory 3. According to this configuration, the user data can be protected even if all component codewords in the group data are not written on the non-volatile memory 3.

Second Embodiment

In the second embodiment, when a command, such as a flash command issued upon a power shutdown, instructing forced writing is received from the host 4, the intermediate result stored in the Parity-B Buffer 52 is written on the non-volatile memory 3. The configuration of the storage device 1 according to the present embodiment is the same as the configuration of the first embodiment.

Figure 6:
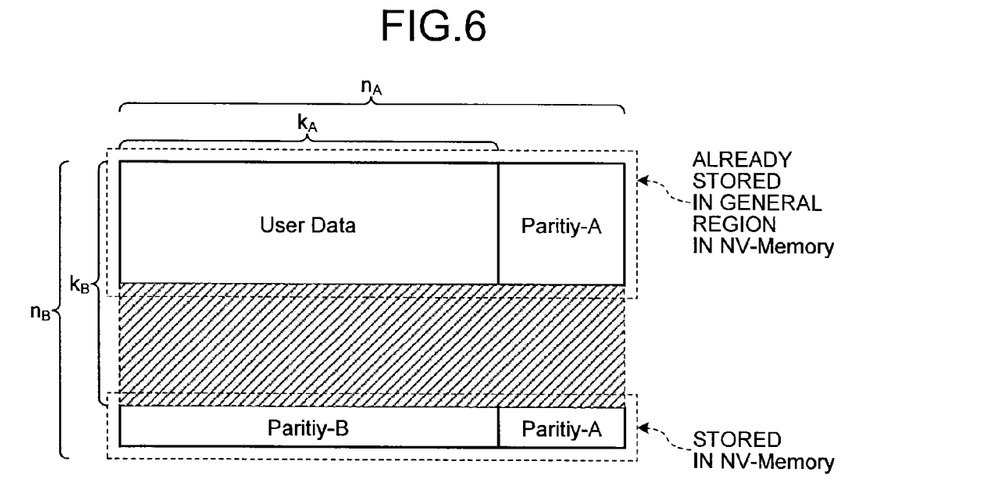
FIG. 6 is a view illustrating one example of a storage state in a non-volatile memory according to a second embodiment.

FIG. 6 is a view illustrating one example of a storage state in a non-volatile memory 3 according to the present embodiment. When receiving a command, the control unit 23 instructs the Parity Controller 246 and the memory I/F 22 to store the intermediate result in the non-volatile memory 3. The Parity Controller 246 controls to read the intermediate result from the Parity-B Buffer 52, and input the read result into the Encoder-B 242 based on the instruction from the control unit 23. The Encoder-B 242 inputs the intermediate result to the Encoder-A 241 as it is. The Encoder-A 241 generates the Parity-A according to the second coding process using the inputted intermediate result. The memory I/F 22 writes the intermediate result and the Parity-A to the page, storing the Parity-B, in the non-volatile memory 3. When a command is not received, the Encoder-A 241 and the Encoder-B 242 execute the second coding process and the first coding process respectively, as in the first embodiment.

Figure 7:
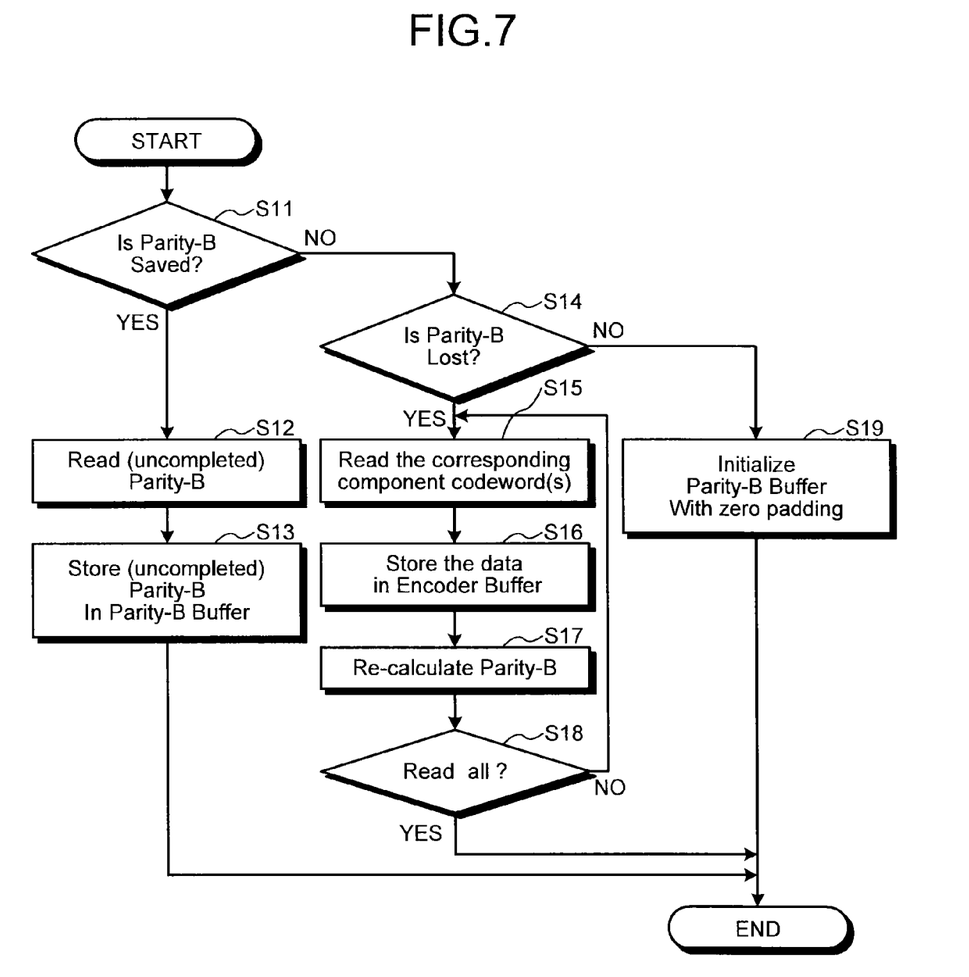
FIG. 7 is a view illustrating one example of a procedure of initialization of Parity-B Buffer after writing by a reception of a command is performed according to the embodiment.

FIG. 7 is a view illustrating one example of a procedure of initialization of the Parity-B Buffer 52 after writing is performed in response to a command according to the present embodiment. FIG. 7 illustrates the procedure of the initialization when the writing is performed in response to the command, power supply is shut down, and then, the power supply is turned on. The control unit 23 checks whether the intermediate result is stored in the non-volatile memory 3 or not (step S11). When the intermediate result is stored in the non-volatile memory 3, the control unit 23 instructs the memory I/F 22 to read the intermediate result from the non-volatile memory 3. The memory I/F 22 reads the intermediate result from the non-volatile memory 3 according to the instruction (step S12). The control unit 23 instructs the Parity Controller 246 to store the intermediate result read from the non-volatile memory 3 to the Parity-B Buffer 52. The Parity Controller 246 stores the intermediate result to the Parity-B Buffer 52 based on the instruction (step S13). In this case, the control unit 23 initializes the Encoder Buffer 51 with zero padding. After the execution of step S13, the initialization process is terminated.

When the intermediate result is not stored in the non-volatile memory 3 (step S11 No), the control unit 23 checks whether the intermediate result on the Parity-B Buffer 52 is lost or not due to the power shutdown (step S14). When the intermediate result on the Parity-B Buffer 52 is lost (step S14 Yes), the control unit 23 instructs the memory I/F 22 to read the unit data and the Parity-A corresponding to the group data of which the writing is not completed before the reception of the command from the non-volatile memory 3. The memory I/F 22 reads the unit data and the Parity-A from the non-volatile memory 3 on the page basis according to the instruction (step S15). The control unit 23 stores the read unit data and the Parity-A into the Encoder Buffer 51 (step S16). The Encoder-B 242 performs the first encoding process using the unit data stored in the Encoder Buffer 51 to re-calculate the Parity-B (intermediate result), and stores the calculated result (intermediate result) into the Parity-B Buffer 52 (step S17). The control unit 23 determines whether reading of all user data and Parity-A that are already stored in the non-volatile memory 3 are terminated (step S18). When reading is terminated (step S18, Yes), the control unit 23 terminates the initialization process. When reading is not terminated, the process returns to step S15.

When the intermediate result on the Parity-B Buffer 52 is not lost due to the power shutdown (step S14 No), the control unit 23 initializes the Encoder Buffer 51 with zero padding (step S19), and then, terminates the initialization process.

After the process described above, the control unit 23 performs the process of writing the data (hatched portion in FIG. 6) that is not yet written in the group data. The Encoder-B 242 executes the first decoding process based on the intermediate result stored in the Parity-B Buffer 52 and the unit data newly inputted, and stores the result after the process into the Parity-B Buffer 52 as the intermediate result. When the total number of the unit data that is already written and the unit data that is newly written becomes $k_B$, the first coding process by the Encoder-B 242 is completed, whereby the Parity-B is completed. The completed Parity-B is written in the non-volatile memory 3. The page to which the completed Parity-B is written is different from the page to which the intermediate result is stored. The intermediate result is written on the page different from the page where the Parity-B of the group data has to be stored, and the completed Parity-B is written on the page where the Parity-B of the group data has to be stored. However, the intermediate result may be written on the page where the Parity-B of the group data is stored, and the completed Parity-B may be written on another page.

In this way, the first coding process that is executed before the power shutdown can be continued, when the power supply is turned on after the power shutdown. The operation (the operation in which the intermediate result is stored in the region corresponding to the Parity-B in the Decoder Buffer 53, when the read request to the user data, which is already written, in the group data is issued, and an error correction is impossible by the second decoding process, in the state in which the group data is not completely written on the non-volatile memory 3 of storing the intermediate result stored in the Parity-B Buffer 52 into the Decoder Buffer 53) as in the first embodiment may be further performed, or may not be performed.

As described above, in the present embodiment, when a command that instructs the forced writing is received, the uncompleted Parity-B (intermediate result) is stored in the non-volatile memory 3. Therefore, the first decoding process can be executed to the user data in the group data, which is not completed. The continuation of the calculation of the Parity-B can be executed, by using the intermediate result, for the data that is not written in the group data.

Third Embodiment

Figure 8:
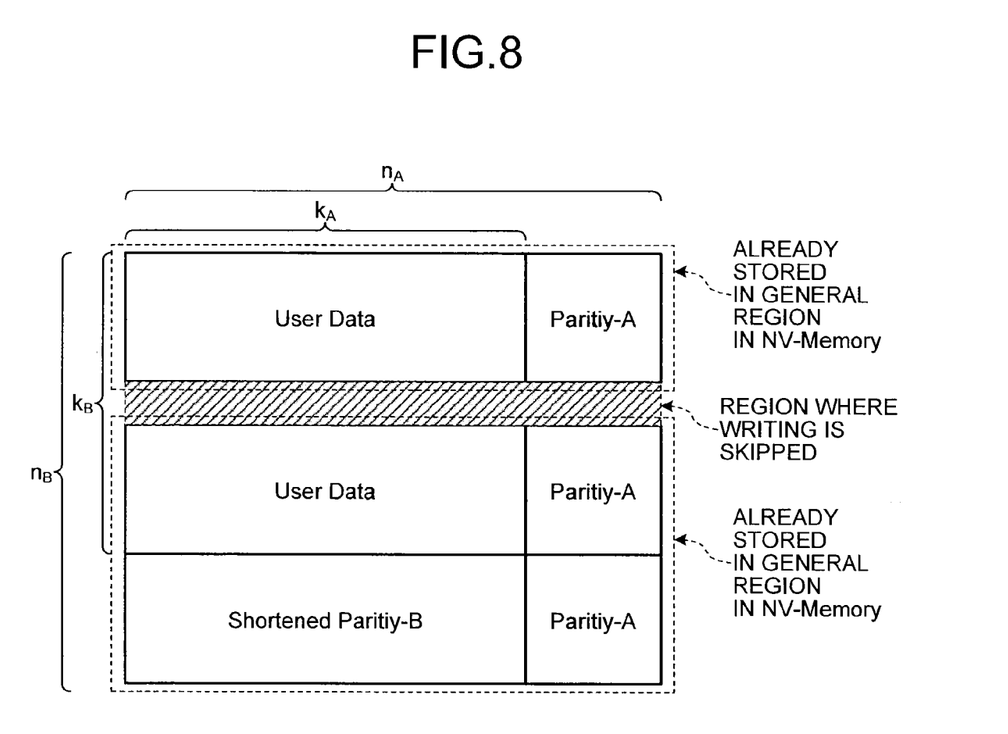
FIG. 8 is a view illustrating a skip region.

The writing to the memory region in the non-volatile memory 3 might be skipped. For example, when there is some defect found beforehand, the writing to the non-volatile memory 3 might be skipped. The third embodiment describes the case where the region to which the writing is skipped (hereinafter referred to as a skip region) is present. As in the first embodiment, data is written to the non-volatile memory 3 in the format illustrated in FIG. 3 in the present embodiment. However, there may be the case in which data is written to the non-volatile memory 3 by skipping some region in the format illustrated in FIG. 3. FIG. 8 is a view illustrating the skip region. The hatched region in FIG. 8 indicates the region where the unit data and the Parity-A are not written on the non-volatile memory 3. The region not hatched indicates the region where the unit data and the Parity-A (and/or the Parity-B and the Parity-A) are written on the non-volatile memory 3.

In such case, in the present embodiment, the Encoder-B 242 performs the first coding process using the user data excluding the data in the skip region (i.e., the user data written on the non-volatile memory 3) to generate the Parity-B. The control unit 23 inputs zero to the Encoder-B 242 instead of the data in the skip region. The Encoder-B 242 executes the first coding process to generate the Parity-B as in the first embodiment, and the completed Parity-B corresponds to the user data including the data in the skip region. Therefore, valid data of input data to the first coding process for the group data including the skip region is less than the one for the general group data (the group data not containing the skip region). In the present specification, the Parity-B generated using the user data including the data in the skip region is referred to as shortened Parity-B. The shortened Parity-B is parity (shortened code parity) generated using the user data excluding the data in the skip region, i.e., the user data with an amount less than the ordinary data. The writing process (including the encoding process) other than the process described above in the present embodiment is the same as that in the first embodiment.

Figure 9:
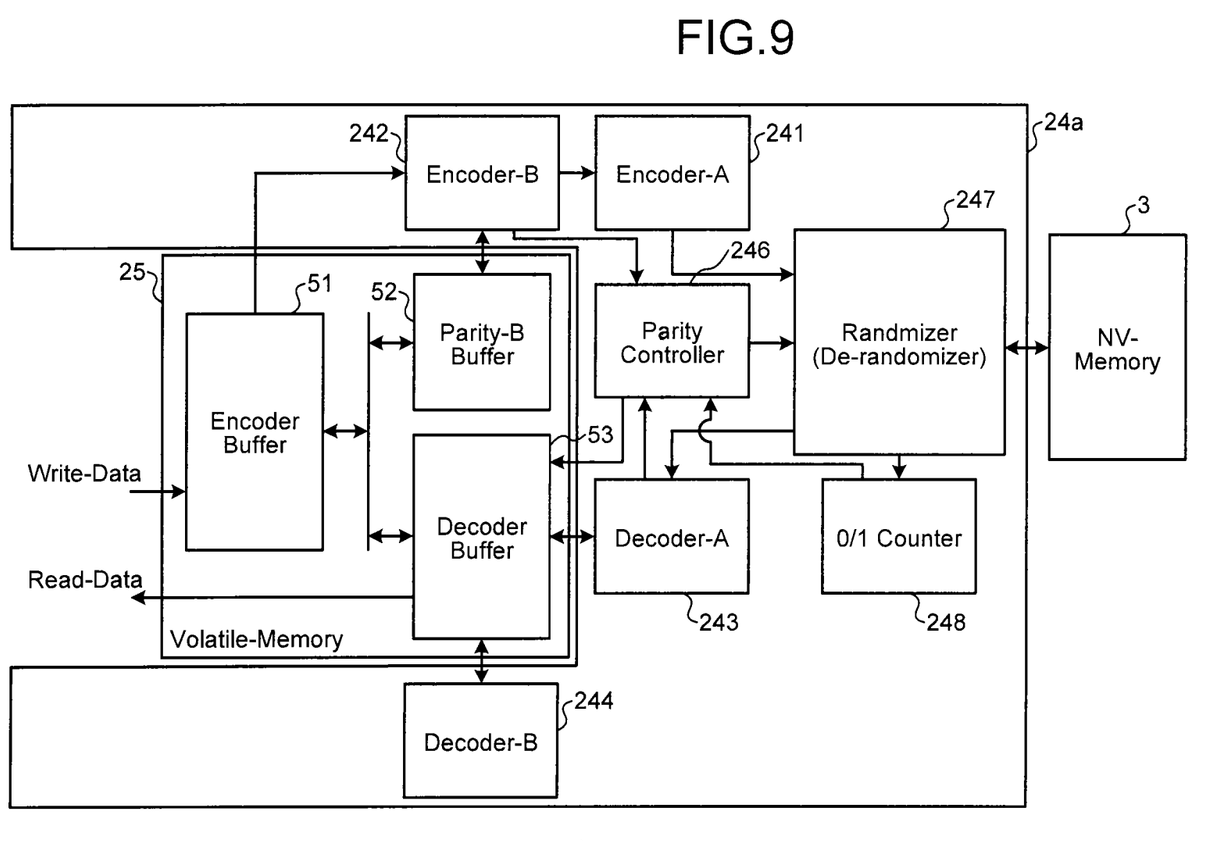
FIG. 9 is a view illustrating an example of a configuration of an encoder/decoder according to a third embodiment.

The configuration of the storage device 1 according to the present embodiment may be the same as that in the first embodiment, or may be the one illustrated in FIG. 9. When the configuration is the same as the configuration in the first embodiment, the control unit 23 manages the skip region using a table. The control unit 23 recognizes the skip region by referring to this table. When the first decoding process is performed to the group data including the skip region, the control unit 23 controls to store the user data, the Parity-A, and the shortened Parity-B read from the non-volatile memory 3 on the Decoder Buffer 53. The skip region is written with zero instead of the data in the skip region in the group data on the Decoder Buffer 53. The Encoder-B 242 performs the first decoding process using the data on the Decoder Buffer 53. With this, the error correction can be carried out to the user data read from the non-volatile memory 3 using the shortened Parity-B.

Next, the case where the skip region is determined without using a table will be described. FIG. 9 is a view illustrating an example of a configuration of a encoder/decoder 24a according to the present embodiment. In the configuration illustrated in FIG. 9, a storage device is the same as the storage device 1 in the first embodiment, except that the encoder/decoder 24 in the storage device 1 according to the first embodiment is replaced by the encoder/decoder 24a. The components having the same function as in the first embodiment are identified by the same numerals, and the redundant description will not be repeated.

The encoder/decoder 24a is formed by adding a Randomizer 247 and 0/1 Counter 248 to the encoder/decoder 24 in the first embodiment. The Randomizer 247 randomizes the unit data and the Parity-A (or the Parity-B and the Parity-A) outputted from the Encoder-A 241. The data after the randomization includes zero and one that are almost equal in number. The memory I/F 22 stores the data after the randomization into the non-volatile memory 3 for each page. The storage format to the non-volatile memory 3 is the same as that illustrated in FIG. 3. The Randomizer 247 has a function as De-Randomizer, and it de-randomizes (the transformation process reverse to the randomization) the data read from the non-volatile memory 3, and inputs the resultant data to the Decoder-A 243. The Randomizer 247 has a function of inputting the data read from the non-volatile memory 3 into the 0/1 Counter 248. The 0/1 Counter 248 determines whether the value of the inputted data is zero or one for each bit, and counts the number of zero bits (the number of zero) and the number of one bits (the number of one).

The first coding process using the configuration illustrated in FIG. 9 is the same as the configuration of recognizing the skip region using a table. The reading process from the non-volatile memory 3 when the configuration illustrated in FIG. 9 is used will be described. During the reading process from the non-volatile memory 3, the Encoder-A 241 performs the second decoding process using the unit data and the Parity-A after the de-randomization. Each page in the skip region on the non-volatile memory 3 is all written with zero or all written with one. When the data in the skip region is read from the non-volatile memory 3, the read data is all zero or all one. Therefore, when the Randomizer 247 executes the de-randomization, the data in the skip region has a random number sequence. Accordingly, the error correction is impossible by the second decoding process.

When the error correction is impossible by the second decoding process, the Parity Controller 246 (or the control unit 23) instructs the Randomizer 247 to input the data corresponding to the unit data to which the error correction is impossible and having the Parity-A before the de-randomization into the 0/1 Counter 248. The Randomizer 247 inputs the data before the de-randomization to the 0/1 Counter 248 based on the instruction. The 0/1 Counter 248 counts the number of zero and the number of one in the data before the de-randomization, and notifies the Parity Controller 246 (or the control unit 23) of the counting result. When a normal writing is performed, the data is randomized by the Randomizer 247, so that the number of zero and the number of one become almost equal to each other. On the other hand, the number of zero is larger than the number of one, or vice versa in the data in the skip region. The Parity Controller 246 (or the control unit 23) determines whether there is a difference between the number of zero and the number of one based on the counting result. Specifically, the Parity Controller 246 (or the control unit 23) can determine whether there is a difference between the number of zero and the number of one based on as to whether the ratio of the number of zero and the number of one falls within "$1-\alpha$" to "$1+\alpha$" ($\alpha$ is a constant). The method of determining whether there is a difference is not limited thereto. When there is a difference between the number of zero and the number of one, the Parity Controller 246 (or the control unit 23) determines that it is the data in the skip region. The Parity Controller 246 (or the control unit 23) then writes zero in the region in the Decoder Buffer 53 corresponding to the skip region. The first decoding process is the same as that in the case where the skip region is managed using a table.

As described above, in the present embodiment, when there is the skip region, the shortened Parity-B storing zero instead of the data in the skip region is generated, and the shortened Parity-B is written on the non-volatile memory 3. During the first decoding process, the decoding process is performed using the shortened Parity-B by inputting zero instead of the data in the skip region. Accordingly, the error correction by the first decoding process can be executed even in the case where the data includes the skip region.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory controller that controls a non-volatile memory, the memory controller comprising:
an encoder configured to sequentially receive data, and to sequentially calculate parity based on the data,
a buffer configured to store the parity calculated by the encoder, the parity stored in the buffer including at least one of completed parity calculated based on the data having predetermined size and intermediate parity calculated based on the data having a size less than the predetermined size;
a write processing unit configured to write the data output from the encoder and the completed parity read from the buffer to a non-volatile memory;
a decoder configured to perform a decoding process based on the data and the completed parity read from the non-volatile memory; and
a controller configured to control the decoder to perform decoding based on the data read from the non-volatile memory and the intermediate parity stored in the buffer when receiving a read request directing to the data for which the intermediate parity in the buffer being generated.

2. The memory controller according to claim 1, wherein the write processing unit writes the data on the non-volatile memory in parallel with the calculation of the parity based on the data in the encoder.

3. The memory controller according to claim 1, further comprising:
a data buffer configured to store the data, wherein,
when the controller receives a read request for the data inputted to the encoder in a state in which only data having size less than the predetermined size is inputted to the encoder, the controller writes zero in a region corresponding to data that is not yet written on the non-volatile memory out of a region allocated to the data having predetermined size, on the data buffer.

4. The memory controller according to claim 3, wherein the encoder is specified as a first encoder, and the parity is specified as first parity; and
the memory controller further includes a second encoder configured to generate second parity using unit data that is data having size less than write unit data,
the write unit data includes the unit data and the second parity.

5. The memory controller according to claim 1, wherein the memory controller performs writing to the non-volatile memory for each write unit data with a predetermined data amount, and
the predetermined size is a multiple of a size of the write unit data.

6. The memory controller according to claim 1, wherein the write processing unit writes the intermediate parity on the non-volatile memory, when a predetermined command is received in a state in which only data having size less than the predetermined size inputted to the encoder.

7. The memory controller according to claim 1, wherein, when writing is not performed on a part of a region, which is specified as an unwritten region, in the non-volatile memory into which the data having predetermined size is to be written, the encoder calculates the parity using zero as input data instead of the data corresponding to the unwritten region.

8. A memory controller that controls a non-volatile memory, the memory controller comprising:
an encoder configured to sequentially receive data, and to sequentially calculate parity based on the data sequentially inputted,
a parity buffer configured to store the parity calculated by the encoder, the parity stored in the parity buffer including at least either one of completed parity calculated based on predetermined size of the data, and intermediate parity calculated based on the data having size less than the predetermined size; and
a write processing unit configured to write the data output from the encoder and the completed parity read from the buffer to a non-volatile memory, wherein
the write processing unit writes the intermediate parity on the non-volatile memory, when receiving a predetermined command in a stage in which the size of the data inputted to the encoder is less than the predetermined size.

9. The memory controller according to claim 8, wherein, when new data is written after the intermediate parity is written on the non-volatile memory, the write processing unit reads the intermediate parity from the non-volatile memory, and the encoder calculates the parity using the intermediate parity read from the non-volatile memory and the new data.

10. The memory controller according to claim 8, further comprising:
a decoder configured to perform a decoding process using the parity and the data.

11. The memory controller according to claim 8, wherein, when writing is not performed on a part of a region, which is specified as an unwritten region, in the non-volatile memory into which the data having predetermined size is to be written, the encoder calculates the parity using zero as input data instead of the data corresponding to the unwritten region.

12. A memory controller that controls a non-volatile memory, the memory controller comprising:
an encoder configured to sequentially receive data, and to sequentially calculate parity based on the data sequentially inputted; and
a write processing unit configured to write the data and the parity to a non-volatile memory, wherein when writing is not performed on a part of a region, which is specified as an unwritten region, in the non-volatile memory into which the data having predetermined size is to be written, the encoder calculates the parity using zero as input data instead of the data corresponding to the unwritten region.

13. The memory controller according to claim 12, further comprising:
a decoder configured to perform a decoding process using the parity and the data read from the non-volatile memory.

* * * * *